(12) United States Patent
Pacheco

(10) Patent No.: US 7,011,403 B1
(45) Date of Patent: Mar. 14, 2006

(54) PRESCRIPTION FLIP UPS

(76) Inventor: Esther Pacheco, 529 E. Chester St., Long Beach, NY (US) 11561

( * ) Notice: Subject to any disclaimer, the term of this patent is extended or adjusted under 35 U.S.C. 154(b) by 0 days.

(21) Appl. No.: 10/961,700

(22) Filed: Oct. 8, 2004

Related U.S. Application Data

(60) Provisional application No. 60/510,525, filed on Oct. 14, 2003.

(51) Int. Cl.
*G02C 9/02* (2006.01)
(52) U.S. Cl. .................................................... 351/59
(58) Field of Classification Search .................. 351/59, 351/41
See application file for complete search history.

(56) References Cited

U.S. PATENT DOCUMENTS

| | | | |
|---|---|---|---|
| 1,545,281 A * | 7/1925 | Royak | 351/50 |
| 2,628,352 A | 2/1953 | Astruck | |
| 3,495,898 A | 2/1970 | Del Vecchio | |
| 3,840,294 A | 10/1974 | Kneier | |
| 4,405,213 A | 9/1983 | Kolkmann | |
| 6,264,325 B1 * | 7/2001 | Peressini et al. | 351/59 |
| 2002/0093622 A1 * | 7/2002 | Tostado | 351/57 |

* cited by examiner

*Primary Examiner*—Huy Mai

(57) ABSTRACT

A pair of eyeglasses for an individual to wear. The pair of eyeglasses is normal in most aspects except for the fact that it has a pair of lens that are pivotally attached to the framework of the eyeglasses. Each lens of the pair of lens can individually be raised, if access to an eye is needed while the eyeglasses are on. The lens can then be lowered again to allow the individual to use the eyeglasses to see properly.

1 Claim, 3 Drawing Sheets

PRESCRIPTION FLIP UPS

I. CROSS-REFERENCE TO RELATED APPLICATIONS

This application claims the benefit of U.S. Provisional Application No. 60/510,525, filed Oct. 14, 2003.

II. BACKGROUND OF THE INVENTION

The present invention concerns that of a new and improved type of eyeglasses for an individual to wear.

III. DESCRIPTION OF THE PRIOR ART

U.S. Pat. No. 4,405,213, issued to Kolkmann, discloses an additional article of eyewear suited for allowing the user to apply makeup.

U.S. Pat. No. 3,840,294, issued to Kneier, discloses a pair of eye glasses with lenses that are capable of individually moving to allow access to the eyes for applying make-up.

U.S. Pat. No. 3,495,898, issued to Del Vecchio, discloses an additional article of eyewear suited for allowing the user to apply makeup.

U.S. Pat. No. 2,628,352, issued to Astruck, discloses a pair of sunglasses with lenses that are mounted with a hinge assembly and capable of upward rotation.

IV. SUMMARY OF THE INVENTION

The present invention concerns that of a new and improved type of eyeglasses for an individual to wear. The eyeglasses are normal in most aspects except for the fact that it has a pair of lens that are pivotally attached to the framework of the eyeglasses. Each lens of the pair of lens can individually be raised, if access to an eye is needed while the eyeglasses are on. The lens can then be lowered again to allow the individual to use the eyeglasses to see properly.

There has thus been outlined, rather broadly, the more important features of a pair of eyeglasses that the detailed description thereof that follows may be better understood and in order that the present contribution to the art may be better appreciated. There are, of course, additional features of the pair of eyeglasses that will be described hereinafter and which will form the subject matter of the claims appended hereto.

In this respect, before explaining at least one embodiment of the pair of eyeglasses in detail, it is to be understood that the pair of eyeglasses is not limited in its application to the details of construction and to the arrangements of the components set forth in the following description or illustrated in the drawings. The pair of eyeglasses is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present pair of eyeglasses. It is important, therefore, that the claims be regarded as including such equivalent constructions insofar as they do not depart from the spirit and scope of the present invention.

It is therefore an object of the present invention to provide a pair of eyeglasses which have all of the advantages of the prior art and none of the disadvantages.

It is another object of the present invention to provide a pair of eyeglasses which may be easily and efficiently manufactured and marketed.

It is another object of the present invention to provide a pair of eyeglasses which are of durable and reliable construction.

It is yet another object of the present invention to provide a pair of eyeglasses which are economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
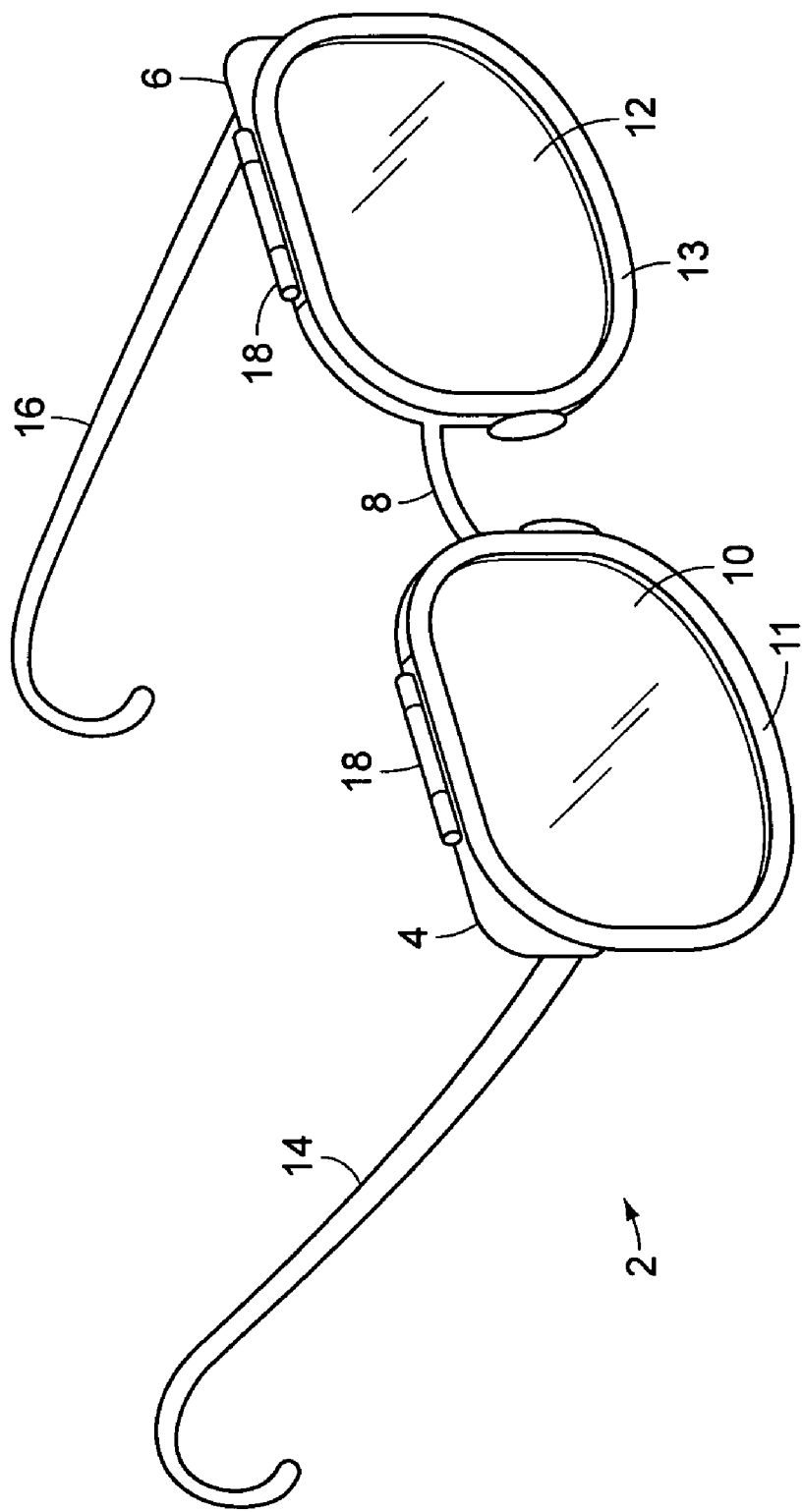
FIG. 1 shows a front perspective view of the eyeglasses, with both lens in a downward position.
Figure 2:
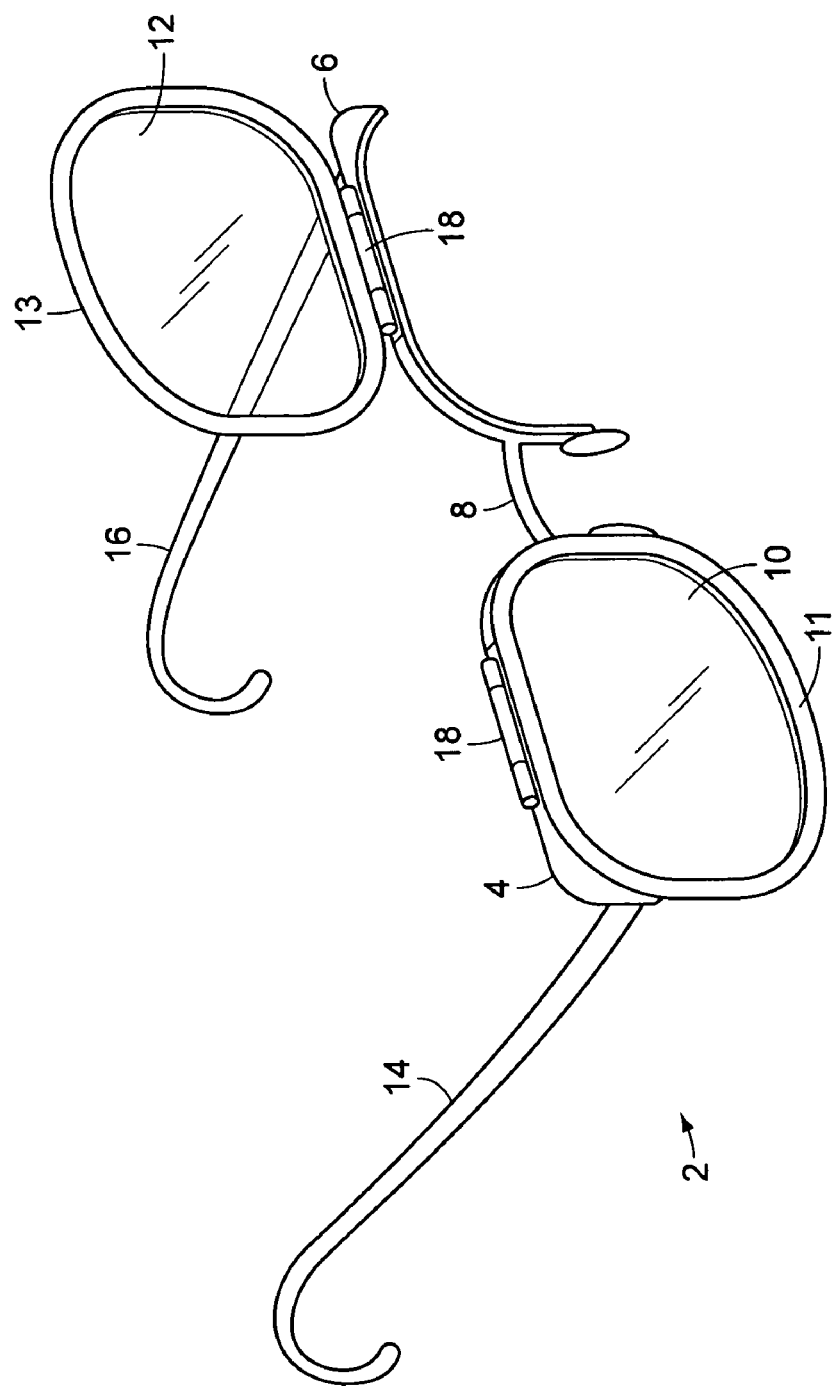
FIG. 2 shows a front perspective view of the eyeglasses, with one lens in a downward position and one lens in an upward position.

FIG. 1 shows a front perspective view of the eyeglasses 2, with both lens in a downward position, while FIG. 2 shows a front perspective view of the eyeglasses 2, with one lens in a downward position and one lens in an upward position.

Eyeglasses 2 comprises two lens holders 4 and 6, a connector bar 8, two lens 10 and 12, and two side holders 14 and 16. Each of the lens holders 4 and 6 are a curved bar, with the lens holder 4 being the left lens holder and the lens holder 6 being the right lens holder. Each lens holder curves in a concave position, as described when the eyeglasses are in an upright position, as viewed in FIGS. 1 and 2.

Connector bar 8 has two ends, a first end and a second end, and connects the two lens holders 4 and 6 to one another. Connector bar 8, once the pair of eyeglasses 2 is placed on a person's face, usually abuts the top of a person's nose. The first end of the connector bar 8 is connected to the lens holder 4, while the second end of the connector bar 8 is connected to the lens holder 6.

Lens 10 has frame 11 that encircles it, while lens 12 has frame 13 that encircles it. Frame 11 of lens 10 is pivotally attached to lens holder 4, while frame 13 of lens 12 is pivotally attached to lens holder 6. Frames 11 and 13 would each be pivotally attached to the appropriate lens holder by a hinge 18.

Side holders 14 and 16 each have two ends, a first end and a second end. The first end of side holder 14 is pivotally attached to lens holder 4, while the first end of side holder 16 is pivotally attached to lens holder 6. Side holder 14 would be placed over a person's left ear once the pair of eyeglasses 2 had been put over an individual's face, while side holder 16 would be placed over a person's right ear once the pair of eyeglasses 2 had been put over an individual's face.

Figure 3:
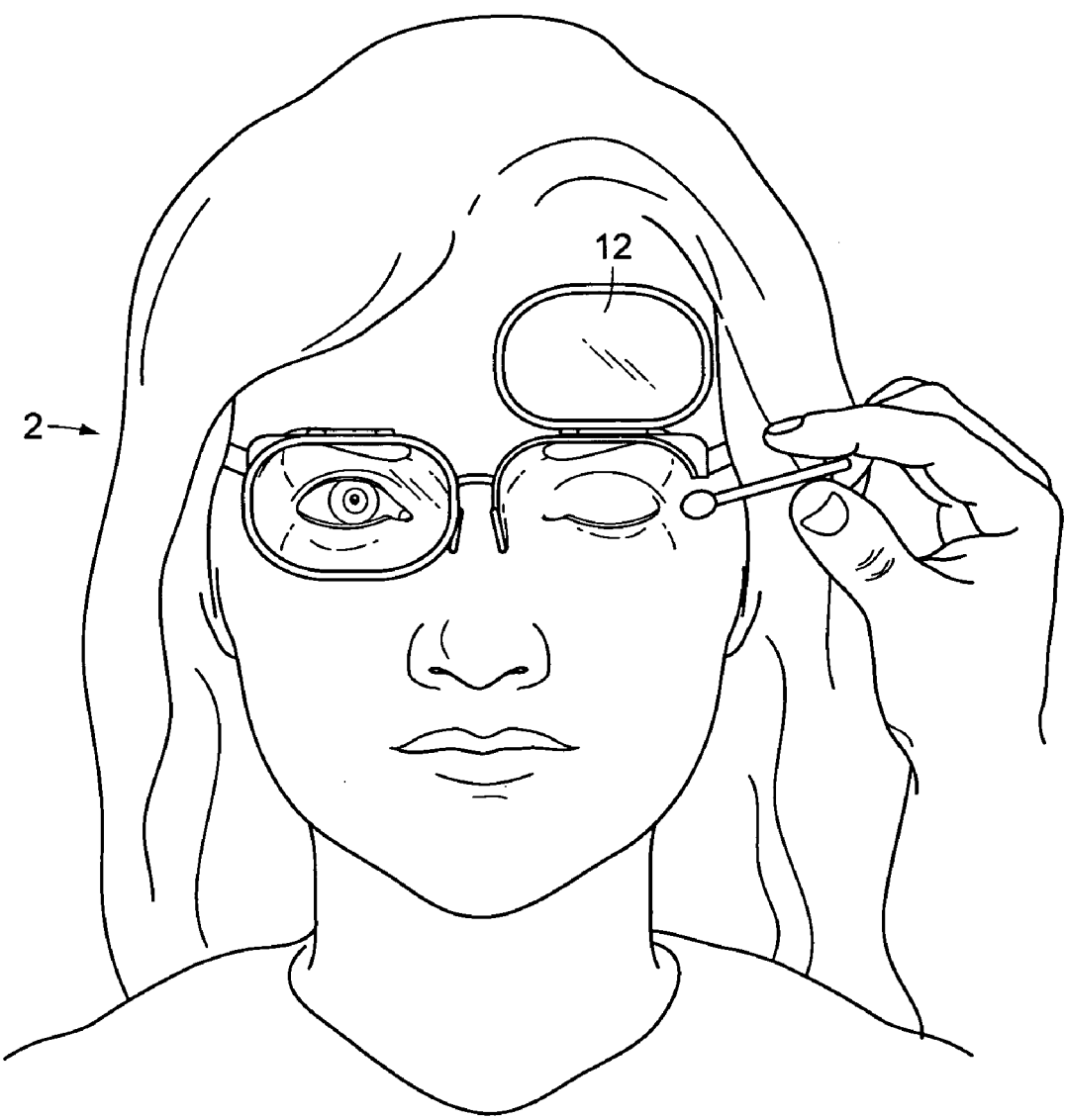
FIG. 3 shows the present invention as it would appear in use.

FIG. 3 shows the present invention as it would appear in use. The pair of eyeglasses 2 has been put over a woman's face. The woman needs to put mascara on her right eyelash, and thus, is able to raise lens 12 temporarily while leaving the eyeglasses 2 on her face. As can be seen, each lens is independently pivotable compared to one another. This will help in a few ways, most importantly by allowing the woman to see clearly through her left eye while she is applying the makeup on her right eyelash.

I claim:

1. A pair of eyeglasses comprising:

a left lens holder a a right lens holder, a connector bar connected between the left lens holder, and the right lens holder, a first circular frame, first hinge means for pivotally connecting the first circular frame to the left lens holder allowing the first circular frame to pivot in a generally upward direction, a second circular frame, second hinge means for pivotally connecting the second circular frame to the right lens holder allowing the second circular frame to pivot in a generally upward direction, a first lens located within the first circular frame, a second lens located within the second circular frame, and a left side holder and a right side holder, each side holder having a first end and a second end, the first end of the left side holder being pivotally attached to the left lens holder, the first end of the right side holder being pivotally attached to the right lens holder, wherein the left side holder is placed over a person's left ear when the pair of eyeglasses are being worn, and further wherein the right side holder is placed over a person's right ear when the pair of eyeglasses are being worn, and wherein the first circular frame is pivotable independently of the second circular frame and the second circular frame is pivotable independently of the first circular frame.

* * * * *